United States Patent [19]
Bost

[11] 4,232,819
[45] Nov. 11, 1980

[54] CONTROL SYSTEM FOR ENVIRONMENTAL APPARATUS

[75] Inventor: Charles Bost, Melbourne, Fla.

[73] Assignee: Sentry Controls, Inc., Melbourne, Fla.

[21] Appl. No.: 922,837

[22] Filed: Jul. 10, 1978

[51] Int. Cl.³ .............................................. E05B 19/26
[52] U.S. Cl. ...................................... 236/47; 70/413; 62/158
[58] Field of Search ............... 165/11; 236/1 R, 46 R, 236/47; 62/231, 158; 70/276, 413, 277; 340/542; 361/171, 172

[56] References Cited

U.S. PATENT DOCUMENTS

| | | | |
|---|---|---|---|
| 2,767,278 | 10/1956 | Collins | 70/276 X |
| 3,571,544 | 3/1971 | Sheehan | 70/413 X |
| 4,045,973 | 9/1977 | Anderson et al. | 62/158 |
| 4,060,123 | 11/1977 | Hoffman et al. | 165/11 |
| 4,150,415 | 4/1979 | Fichtner | 361/182 |

*Primary Examiner*—William E. Wayner
*Attorney, Agent, or Firm*—Duckworth, Hobby, Allen & Pettis

[57] ABSTRACT

A switching system for controlling operation of conventional environmental apparatus of the type having an electrical connection adapted to be coupled with a supply of electrical current includes a switching circuit in a first housing for making and breaking a circuit connection between the connection and the current supplied, and a control circuit electrically coupling a magnetic detector with the switching circuit in order to operate the switching circuit to alternatively make and break the circuit connection between the power cord and the current supply responsive to detection of a magnetic element.

15 Claims, 5 Drawing Figures

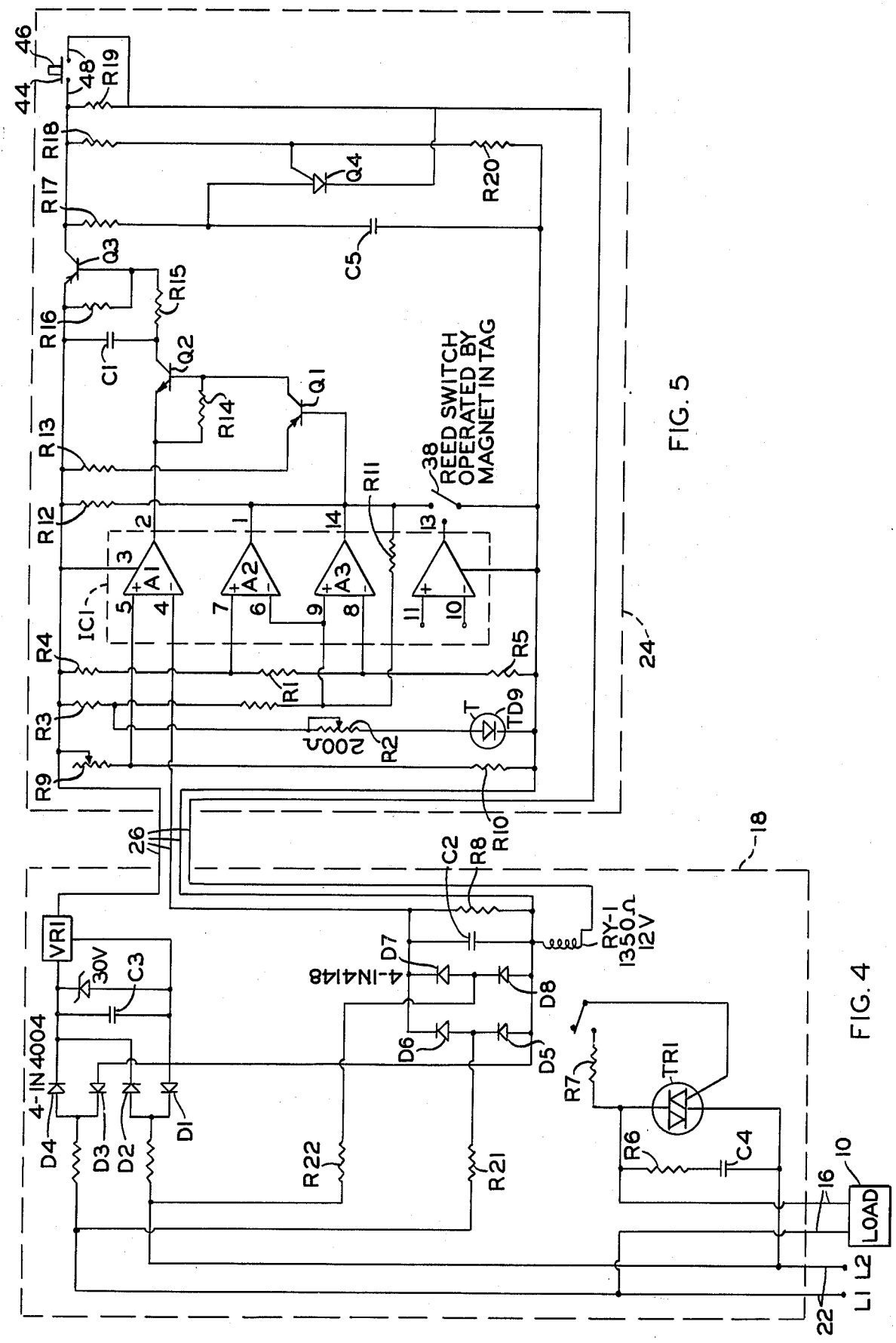

CONTROL SYSTEM FOR ENVIRONMENTAL APPARATUS

BACKGROUND OF THE INVENTION

1. Field of the Invention

The present invention relates to systems for controlling the operation of electrical apparatus.

2. Description of the Prior Art

Modern hotels and motels customarily have environmental control apparatus therein, such as an air conditioner and/or a heater, which is adapted to maintain the room at a predetermined temperature. While the heating and air conditioning systems employed in such facilities customarily have automatic thermostats to ensure that the room is maintained at a desired comfort level, the operation of these systems when the room is not in use results in an undesirable waste of electrical energy.

Systems have been developed for controlling environmental apparatus in motels and hotels by the insertion of the occupant's room key into a simple, key operated thermostat adjacent the heating and air conditioning unit in the motel or hotel rooms. Apparatus of this type is manufactured by Fabri-Tek, Inc. of Minneapolis, Minnesota, and is identified by Model No. RMS-7.

Other systems have also been devised for the motel and hotel industry to control operation of restricted television channels, in order to permit the occupant to view a particular channel upon payment of the required fee, thus gaining access to a first run movie or some other desirable presentation on the restricted channel.

The prior art also suggests numerous arrangements for utilizing magnetic keying elements as a switch for energizing electrical appliances. Examples of such arrangements are disclosed in the following United States Patents:

U.S. Pat. No. 2,931,953—W. Barney;
U.S. Pat. No. 2,595,769—H. Cooley;
U.S. Pat. No. 3,611,763—B. S. Sedley;
U.S. Pat. No. 3,571,544—Sheehan;
U.S. Pat. No. 3,006,178—M. Rifkin;
U.S. Pat. No. 2,767,278—D. Collins;
U.S. Pat. No. 2,746,745—R. H. Damon.

SUMMARY OF THE INVENTION

The present invention contemplates a switching system for controlling operation of conventional electrical apparatus such as an air conditioner or the like of the type having a power cord adapted to be connected to a supply of electrical current, in which the switching system includes a first housing having first means for receiving the power cord and second means connected with the current supply. The system further includes a switching circuit in the first housing for making and breaking a circuit connection between the power cord and the supply of electrical current through the first and second means, as well as a second housing having a magnetic detector therein. Circuit means are provided for electrically coupling the magnetic detector with the switching circuit in order to operate the switching circuit to alternately make and break the circuit connection between the power cord and the current supply responsive to detection of a magnetic element in the second housing. The system further includes a keying mechanism having a magnetic element and dimensioned to permit movement of the magnetic element into and out of the second housing in order to alternately make and break the circuit connection between the power cord and the supply of electrical circuit.

In a preferred embodiment of the present invention, the circuit means is designed to control the switching circuit to make the circuit connection responsive to the presence of the magnetic element in the second housing, and to break the circuit connection responsive to the removal of the magnetic element from the second housing. Further, the circuit means of the preferred embodiment includes means for introducing a first time delay period between removal of the magnetic element in the second housing and breaking of the circuit connection, this first time delay being designed to prevent detrimental effects to an air conditioner, or other electrical appliance, which may be caused by rapidly inserting and removing the keying mechanism into and out of the second housing, an operation that is sometimes referred to as "jiggling".

The preferred embodiment of the present invention further includes means for sensing the line voltage of the current supply and preventing energization of the switching circuit when the line voltage of the current supply is abnormal with respect to a predetermined voltage level. Further, the circuit means may be provided with means for introducing a second time delay period between operation of the switching circuit and resumption of the predetermined voltage level, following sensing of the abnormal voltage condition. The purpose of this second time delay is, for example, to prevent unnecessary damage to an air conditioner compressor which is being switched by the switching circuits by allowing time for the gas pressures in the compressor to equalize, thus preventing restarting under load.

In accordance with another aspect of the present invention, the circuit means is provided with a temperature sensor coupled with the switching circuit for operation thereof at a predetermined temperature level without the presence of the magnetic element in the second housing. Accordingly, when used in a motel or hotel room to control the heater or air conditioning system associated therewith, a minimum comfort level may be maintained, while reducing the electrical load which would otherwise by required with a conventional thermostat.

Additionally, the preferred embodiment of the control system of the present invention includes a third time delay between detection of the magnetic element in the second housing, and operation of the switching circuit. A mechanical bypass switch in the second housing may be operated responsive to the extension of the keying mechanism completely through the housing, to bypass the third time delay for immediate operation of the electrical apparatus controlled by the switching circuit.

THE DRAWING

FIG. 1 depicts the system of the present invention in combination with environmental control apparatus as used in a conventional hotel or motel room.

FIG. 2 illustrated a portion of the system shown in FIG. 1.

FIG. 4 is a schematic circuit diagram of a portion of the apparatus shown in FIG. 2.

FIG. 5 is a schematic circuit diagram of another portion of the apparatus shown in FIG. 3.

DETAILED DESCRIPTION

A detailed description of the preferred embodiment will now be described with reference to the drawings.

Figure 1:
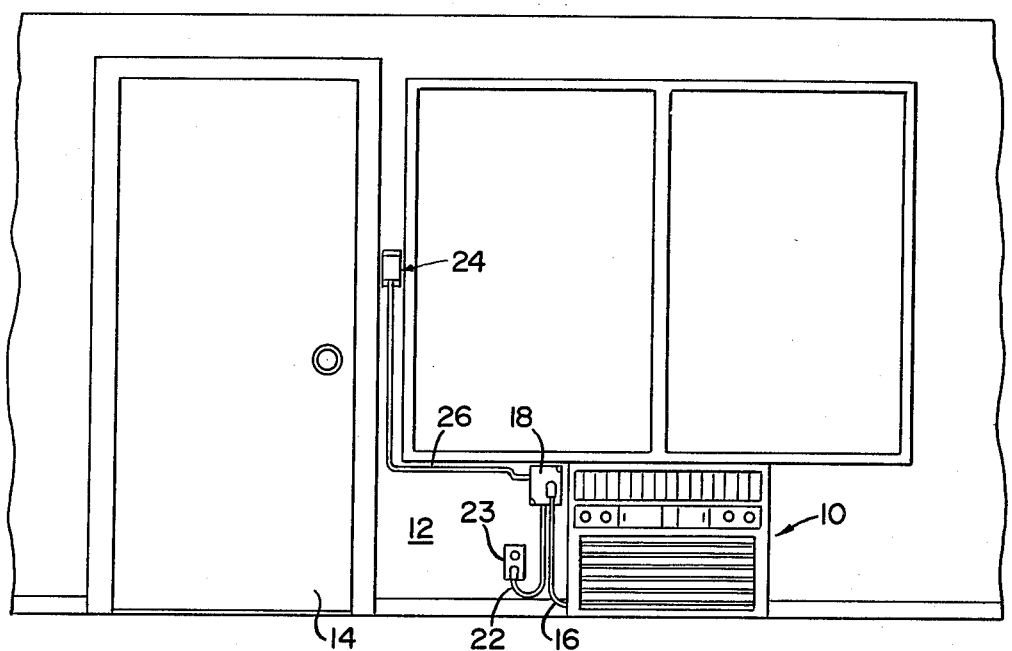
Figure 2:
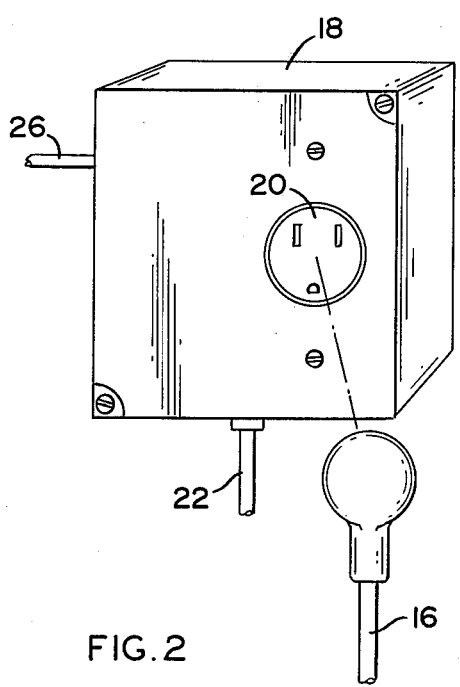

Noting FIGS. 1 and 2, the system of the present invention is useful in a motel or hotel room, as is shown in FIG. 1, to control an air conditioner 10 extending through a wall 12 of the room. The room includes a door 14 permitting access thereto. The air conditioner 10 includes a power cord 16 which is conventionally connected to a source of electricity to permit operation of the air conditioner.

Noting both FIGS. 1 and 2, the system of the present invention includes a first housing 18 which preferably is mounted adjacent to the air conditioner 10. As is shown in greater detail in FIG. 2, the first housing 18 includes a conventional electrical current plug 20 which is adapted to receive the power cord 16 of the air conditioner 10, and a cord 22 which is adapted to be coupled to a conventional electrical wall outlet 23 which, in turn, is coupled with a source of alternating electrical current.

Referring again to FIG. 1, the system includes a second housing 24, which is described in greater detail below with reference to FIG. 3. The second housing is electrically coupled to the first housing via a control cable 26.

Figure 3:
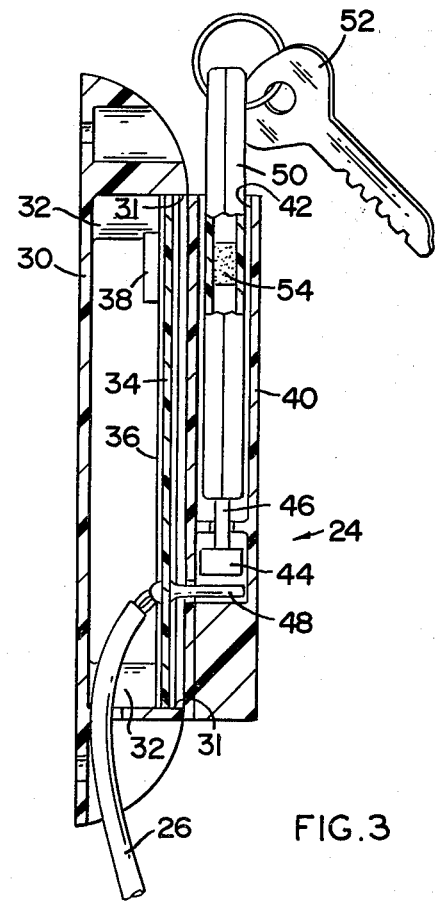
FIG. 3 illustrates another portion of the apparatus shown in FIG. 1.

Referring now to FIG. 3, the second housing 24 (which is shown in cross-section in FIG. 3) includes a back plate 30 having an open front side 31. The form of construction of the back plate 30 is not critical, but preferably is relatively thin in order to permit the second housing 24 to be mounted adjacent the door 14 without creating a serious obstruction to persons walking into and out of the room. The back plate 30 includes raised corners 32 which are adapted to support a printed circuit board 34 having conductive strips 36 thereon which are designed to interconnect various circuit components (not shown in FIG. 3) on the printed circuit board in accordance with an electronic circuit layout which is described below in greater detail with reference to FIG. 5. A reed switch 38 is mounted in the printed circuit board 34 and is interconnected with the conductive layers 36 in a conventional manner. As is shown in FIG. 3, the reed switch 38 is positioned in the upper portion of the back plate 30.

The second housing 24 further includes a front plate 40 formed in the shape of a thin container having an opening defining a slot 42 from the top surface thereof. An opening at the bottom of the front plate 40 is adapted to hold a mechanical switch 44 having an actuator 46 which extends axial with the slot 42 in the front plate. Electrical leads 48 interconnect the switch 44 with the printed circuit board 34 within the back plate 30.

Preferably, the back plate 30 and the front plate 40 are formed of a non-metallic material, such as a molded plastic. Additionally, a key mechanism 50, described below, likewise is preferably formed of a non-metallic, plastic material.

With continuing reference to FIG. 3, the key mechanism 50 preferably comprises a hollow plastic tab having a key 52 attached thereto in a conventional manner. A magnetic element 54 is positioned within the hollow core of the key mechanism 50, in order to actuate the reed switch 38 in a manner described in greater detail below. Thusly, it will be understood that the thickness of the intermediate wall of the front plate 44 in the open front side of the back plate 30 must be sufficiently thin to ensure that the magnetic element 54 is capable of operating the reed switch 38.

The specific circuit design of the present invention will now be described with reference to FIGS. 4 and 5.

Noting FIG. 4, a dotted line about the circuit in this figure indicates that the circuit contained therein is positioned within the first housing 18. In a similar manner, the circuit of FIG. 5 is positioned within the second housing 24, with the cable 26 therebetween.

The circuit of FIGS. 4 and 5 includes capacitors, resistors, an integrated circuit quad voltage comparator, transistors, thyristors and other circuit components which are illustrated using symbols well known to those skilled in the electronic arts. Those components of the circuits of FIGS. 4 and 5 which are depicted in FIGS. 2 and 3 are identified by like reference numerals. Each additional component shown in FIGS. 4 and 5 is identified by an appropriate upper case letter, such as capacitor C, resistor R, integrated circuit comparator IC, switch S, diode D, transistor Q, Triac TR, and so forth, followed by a reference numeral. While specific values and examples of the circuit components are set forth in the attached appendix, it will be understood that changes in the circuit values and the selection of particular components can be made without departing from the scope of the present invention.

As noted above, the circuit within the first housing 18 is shown in FIG. 4. The incoming power line 22 from the source of electrical current 23 (FIG. 1) is rectified by a full-wave bridge circuit including diodes D1–D4 and is coupled to the emitter of transistor Q3 via the cable 26 and conventional 24 volt voltage regulator VR1. Additionally, the source of electrical current via the power cord 22 is coupled to a voltage sensing circuit defined by diodes D6–D8 through resistors R21 and R22, the specific values of which are determined by the particular voltage input required for operation of the load 10. For example, for a 110-volt input for operation of a conventional 110-volt air conditioner 10, the value of resistors R21 and R22 may be on the order of 100 kilowatts. The outputs of the voltage sensing circuit is coupled through the cable 26 to an integrated circuit voltage comparator IC1 contained within the second housing 24.

The load 10 (for example, the air conditioner of FIG. 1) is coupled to the line via a triac TR1 contained within the first housing 18, which in turn is energized by a relay RY1, also contained within the first housing. One side of the relay RY1 is coupled to the voltage sensing circuit defined by diodes D6–D8, and the other side thereof is connected through the cable 26 to the collector of the transistor Q3, which in turn is coupled in series to the relay by the mechanical switch 44. As will be described in greater detail below, the coupling of the relay RY1 to the transistor Q3 via the cable 26 is through a time delay circuit including transistor Q4, resistors R17, R18 and R20 and capacitor C5.

Referring to the left hand side of FIG. 5, there is shown an impedance bridge defined by resistors R1, R2, R3, R4 and R5, with temperature sensing diode TD9 being located in one leg of that bridge.

As is shown in FIG. 5, the quad voltage comparator IC1 includes three independent operational amplifiers, which are identified as A1, A2 and A3. Amplifier segment A1 is connected to the voltage sensing circuit of diodes D5–D8, and conducts if the output of that voltage sensing network is not low, as defined by resistors R9 and R10. Resistor R9 is a potentiometer which permits adjustment of the particular voltage sensing level below which amplifier segment A1 will not conduct.

In a similar manner, the impedance bridge defined by resistors R1–R5 and the temperature sensing diode TD9 are coupled to amplifier segments A2 and A3. It will be understood that the particular connection of the resistors R1–R5 with amplifier segments A2 and A3 define different turn-on characteristics for each amplifier segment, thus permitting each segment to energize transistor Q1 at a particular temperature level as determined by temperature sensing diode TD9.

Amplifier segment A1 is coupled to the emitter of transistor Q2, and energizes that transistor if the sensed line voltage is adequate as determined by resistor R9. In a similar manner, if the temperature is sufficiently low to cause conduction of segment A3, then transistor Q1 is energized, thus causing transistor Q2 and subsequently transistor Q3 (after a time delay discussed below) to energize.

In a similar manner, closure of reed switch 38 will effect energization of transistors Q1, Q2 and Q3.

Operation of the system will now be described with reference to FIGS. 1–5.

Initially, the room tenant is given the key mechanism shown in FIG. 3 at the check in. Preferably, instructions for operation of this system are printed on the non-metallic key mechanism 50. At the time the occupant enters the room, the key mechanism 50 is inserted in the slot 42 of the second housing 24. As the magnetic element passes adjacent to reed switch 38, the reed switch closes, energizing transistors Q1 and Q2. To immediately initiate operation of the air conditioner 10, the occupant may depress the key mechanism firmly downward to force the switch actuator 46 of the switch 44 to close the circuit connection between the leads 48. (Note FIGS. 3 and 5). At that time, current flows through the relay RY1, thus closing that relay and turning on triac TR1, and in turn causes current to flow through the load 10 via the power cord 16.

In the event that the occupant does not depress the key mechanism 50 a sufficient distance to energize the switch 44, then the relay RY1 will in turn be energized after a first time delay. The first time delay circuit is defined by transistor Q4 and associated resistors R17, R18 and R20, as well as capacitor C5. The purpose of this time delay is to prevent energization of the load 10 following closing of the reed switch 38, but before operation of the mechanical bypass switch 44. Preferably, this time delay is on the order of three minutes.

In the above description of the energization of the load 10, both before and after the predetermined time delay associated with transistor Q3, it is understood that amplifier segment A1 is in a conducting state, by virtue of a sufficient line voltage sensed by diodes 5–8. In the event that an insufficient line voltage is sensed by that circuit, amplifier segment A1 is in a non-conducting state, thereby preventing conduction of transistor Q2. In this way, even upon operation of the reed switch 38 or the bypass switch 44, energization of the load 10 is prevented.

It will also be understood that the first time delay circuit serves to prevent return of the load 10 across the line following a low voltage condition as sensed by the circuit defined by diodes D5–D8, since the change of the amplifier segment A2 to the non-conducting state will turn off transistor Q2, thereby re-initiating the time delay period of transistor Q4 and associated circuitry.

When the keying element 50 is removed from the slot 42 of the second housing 24, then transistor Q2 is deenergized. However, transistor Q3 remains on during the time that capacitor C1 is discharging, thus defining a second time delay, which preferably is on the order of between 10 to 30 seconds. The purpose of this time delay is to ensure that the load 10 remains emergized after removal of the keying element 50, thus preventing damage to the load caused by "jiggling" of the key mechanism in the slot 42.

Turning to the temperature measuring circuit of the bridge defined by resistors R1–R5, resistor R1 is a differential resistor, in which changes of one ohm of resistance represent a one degree Fahrenheit change for amplifier segments A2 and A3. Potentiometer R2 sets a base level for the voltage comparator circuit of amplifier segment A3. When the circuit is placed in a 75° Fahrenheit room temperature, resistor R2 is calibrated to the ambient temperature. Thereafter, sufficient swings in the temperature as determined by sensing diode TD9 will energize transistor Q1, which in turn closes relay RY1 in the manner described above, thereby energizing the load 10 until such time as the air conditioner or heater defined by the load returns the temperature to the desired setting.

APPENDIX

| | | |
|---|---|---|
| C1 | = | 25 microfarad |
| C2 | = | 10 microfarad |
| C3 | = | 50 microfarad |
| C4 | = | .1 microfarad |
| C5 | = | 25 microfarad |
| R1 | = | 30.1 ohm |
| R2 | = | 0-200 ohm potentiometer |
| R3 | = | 23.2 kilohm |
| R4 | = | 23.2 kilohm |
| R5 | = | 698 ohm |
| R6 | = | 100 ohm |
| R7 | = | 100 ohm |
| R8 | = | 27 kilohm |
| R9 | = | 0-1.0 megohm potentiometer |
| R10 | = | 100 kilohm |
| R11 | = | 1 metohm |
| R12 | = | 10 kilohm |
| R13 | = | 10 kilohm |
| R14 | = | 6.8 kilohm |
| R15 | = | 270 kilohm |
| R16 | = | 1 megohm |
| R17 | = | 2.0 megohm |
| R18 | = | 1 megohm |
| R19 | = | 4.7 kilohm |
| R20 | = | 1.5 megohm |
| R21, R22 | = | variable |
| TR1 | = | SC 260D |
| D1–D4 | = | 1N4004 |
| D5–D8 | = | 1N4148 |
| RY-1 | = | 1350 ohm, 12 volt relay |
| IC1 | = | National Semiconductor LM339 Quad Voltage Comparator |
| TD-9 | = | 1N914 temperature sensing diode |
| Q1 | = | 2N3705 |
| Q2 | = | 2N3702 |
| Q3 | = | 2N3705 |
| Q4 | = | 2N6027 Unijunction transistor |

I claim:
1. A switching system for controlling operation of conventional electrical apparatus such as an air conditioner or the like of the type having a power cord adapted to plug into a supply of electrical current, said switching system comprising:
   a first housing having first means for receiving said power cord and second means for connecting with said current supply;

a switching circuit in said first housing for making and breaking a circuit connection between said power cord and said current supply through said first and second means;

a second housing;

a magnetic detector with said second housing;

circuit means electrically coupling said magnetic detector with said switching circuit in order to operate said switching circuit to alternately make and break said circuit connection between said power cord and said current supply responsive to detection of a magnetic element adjacent said second houseing, said circuit means including:

(a) means for making said circuit connection responsive to the presence of said magnetic element in said second housing, and breaking said circuit connection responsive to removal of said magnetic means from said second housing;

(b) means for introducing a first time delay period between detection of the removal of said magnetic element in said second housing and breaking of said circuit connection;

(c) means for initiating a second time delay between detection of said magnetic element in said second housing and operation of said switching means;

(d) means for bypassing said second time delay initiating means to energize said switching means following detection of said magnetic element in said second housing; and a keying mechanism having a magnetic element therewith and dimensioned to permit movement of said magnetic element into and out of said second housing.

2. The system recited in claim 1 wherein said circuit means further includes means for sensing the line voltage of said current supply and preventing energization of said switching circuit when the line voltage of said current supply is abnormal with respect to a predetermined voltage level.

3. The system recited in claim 2 wherein said circuit means further includes means for introducing a second time delay period between operation of said switching circuit and resumption of said predetermined voltage level following sensing of an abnormal voltage condition.

4. The system recited in claim 3 wherein said circuit means further includes temperature sensing means for operating said switching circuit at a preselected temperature level without the presence of said magnetic element in said second housing.

5. The system recited in claim 4 wherein said temperature sensing means comprises a bridge circuit having a temperature sensing element in one leg of said bridge.

6. The system recited in claim 1 wherein said bypassing means comprises a mechanical switch operable responsive to the extension of said keying mechanism through said second housing.

7. A system for providing efficient utilization of environmental control apparatus, comprising:

an enclosure having an access thereto;

environmental control apparatus for controlling the environment in said enclosure;

a supply of electrical current;

a switching circuit interposed between said environmental control apparatus and said supply of electrical current for making and breaking a circuit connection therebetween;

a housing having a magnetic detector;

circuit means electrically coupling said magnetic detector with said switching circuit in order to operate said switching circuit for making said circuit connection responsive to the presence of a magnetic element in said second housing and breaking said circuit connection responsive to the removal of a magnetic element in said second housing, said circuit means including means for introducing a first time delay period between detection of the removal of said magnetic element in said second housing and breaking of said circuit connection;

means in said housing for bypassing said first time delay means for operating said switching means responsive to closure thereof; and a keying mechanism having a magnetic element therewith and dimensioned to permit movement of said magnetic element into and out of said housing.

8. The system recited in claim 7 wherein said housing is located in said enclosure adjacent said access.

9. The system recited in claim 7 wherein said circuit means further includes means for sensing the line voltage of said current supply and preventing energization of said switching circuit when the line voltage of said current supply is abnormal with respect to a predetermined voltage level.

10. The system recited in claim 9 wherein said circuit means further includes means for introducing a second time delay period between operation of said switching circuit and resumption of said predetermined voltage level following sensing of an abnormal voltage condition.

11. The system recited in claim 7 further comprising temperature sensing means for operating said switching circuit at a predetermined level without the presence of said magnetic element in said housing.

12. The system recited in claim 7 further comprising means for initiating a second time delay between detection of said magnetic element in said housing and operation of said switching circuit.

13. A switching system for controlling operation of conventional electrical apparatus such as an air conditioner or the like of the type having a power cord adapted to plug into a supply of electrical current, said switching system comprising:

a switching circuit for making and breaking a circuit connection between said power cord and said current supply;

circuit means electrically coupled with said switching circuit to make said circuit connection between said power cord and said current supply responsive to the presence of an external stimulus, and breaking said circuit connection responsive to the removal of said external stimulus;

means for introducing a first time delay between removal of said external stimulus and breaking of said circuit connection;

means for introducing a second time delay between detection of said external stimulus and making of said circuit connection; and a bypass switch for bypassing said second time delay means for initiating operation of said switching circuit for making said circuit connection responsive to operation of said bypass switch.

14. The system recited in claim 13 further comprising:

means for sensing the line voltage of said current supply and preventing energization of said switching circuit when the line voltage of said current supply is abnormal with respect to a predetermined voltage level; and means for recycling said second time delay initiation means in order to introduce said second time delay period between operation of said switching circuit and resumption of said predetermined voltage level following sensing of an abnormal voltage condition.

15. The system recited in claim 13 further comprising temperature sensing means for operating said switching circuit at a predetermined temperature level without the presence of said external stimulus.

* * * * *